(12) United States Patent
Merino Lopez

(10) Patent No.: US 7,997,315 B2
(45) Date of Patent: Aug. 16, 2011

(54) WEAR-ADAPTABLE RUNNING TREAD

(75) Inventor: Jose Merino Lopez, Riom (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 657 days.

(21) Appl. No.: 12/068,211

(22) Filed: Feb. 4, 2008

(65) Prior Publication Data

US 2008/0128062 A1 Jun. 5, 2008

Related U.S. Application Data

(60) Division of application No. 10/984,850, filed on Nov. 10, 2004, now Pat. No. 7,363,951, which is a continuation of application No. PCT/EP03/04722, filed on May 6, 2003.

(30) Foreign Application Priority Data

May 15, 2002 (FR) ..................................... 02 06004

(51) Int. Cl.
*B60C 11/12* (2006.01)
*B60C 11/13* (2006.01)
(52) U.S. Cl. .......... 152/209.21; 152/209.17; 152/DIG. 3
(58) Field of Classification Search ............. 152/209.17, 152/DIG. 3, 209.21
See application file for complete search history.

(56) References Cited

U.S. PATENT DOCUMENTS

| | | | |
|---|---|---|---|
| 2,143,528 | A | 1/1939 | Thomas |
| 6,264,453 | B1 | 7/2001 | Jacobs et al. |
| 6,408,910 | B1 | 6/2002 | Lagnier et al. |
| 7,213,625 | B2 | 5/2007 | Martin et al. |
| 7,363,951 | B2 * | 4/2008 | Lopez ...................... 152/209.17 |
| 2003/0047263 | A1 | 3/2003 | Lopez |
| 2004/0016491 | A1 | 1/2004 | Martin et al. |
| 2004/0089384 | A1 | 5/2004 | Lopez et al. |

FOREIGN PATENT DOCUMENTS

| | | |
|---|---|---|
| EP | 1 125 709 | 8/2001 |
| JP | 03-014704 | 1/1991 |
| JP | 04-113905 | 4/1992 |
| WO | WO 98/54009 | 12/1998 |
| WO | WO 01/60641 | 8/2001 |
| WO | WO 02/090094 | 11/2002 |

* cited by examiner

*Primary Examiner* — Steven D Maki
(74) *Attorney, Agent, or Firm* — Buchanan, Ingersoll & Rooney PC

(57) ABSTRACT

A rubber tread of a tire includes cavities spaced radially inwardly from a running surface of the tread when new. Each cavity includes an incision, and a groove communicating with a radially inner end of the incision when the tread is new. The incision has a radially outer generatrix following an undulating profile having an amplitude of at least 20% of a maximum height of the cavity. A width of the incision is not greater than 2.5 mm, and the groove width is greater than 2.5 mm.

6 Claims, 2 Drawing Sheets

V-V

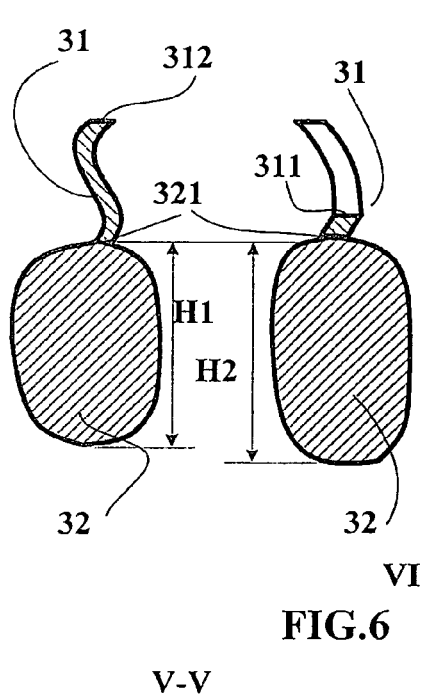
FIG. 5
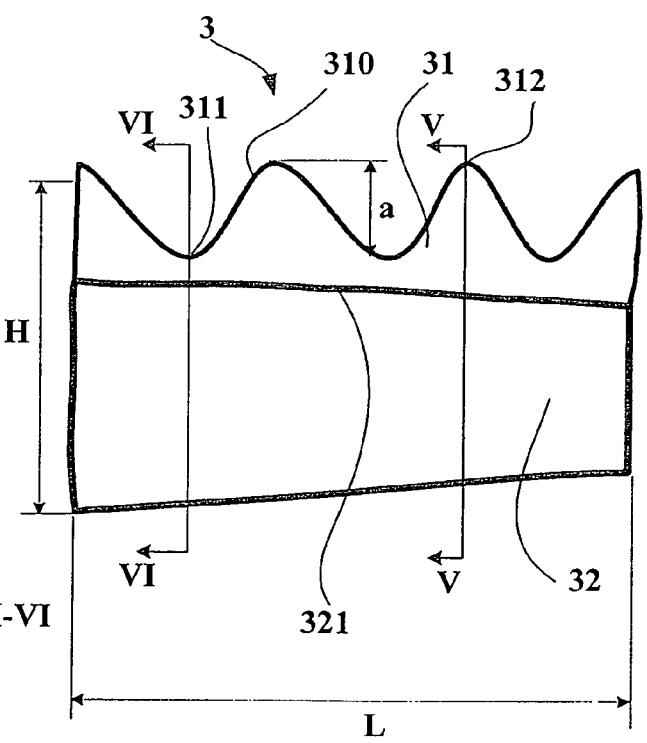
FIG.4
FIG.6

US 7,997,315 B2

WEAR-ADAPTABLE RUNNING TREAD

RELATED INVENTIONS

This application is a Division of U.S. application Ser. No. 10/984,850 filed on Nov. 10, 2004 now U.S. Pat. No. 7,363,951, which is a continuation of International PCT/EP03/04722 filed May 6, 2003 and which claims priority of patent application Ser. No. 02/06004 filed in France on May 15, 2002.

FIELD OF INVENTION

The invention relates to tread patterns for tires and in particular for tires intended to be fitted on heavy vehicles.

BACKGROUND OF INVENTION

In order to ensure that a tread performs optimally on all types of ground (dry or wet), it is known to provide this tread with a tread pattern formed of a plurality of tread pattern elements defined by cutouts (adopting the form either of grooves or of incisions), these cutouts opening onto the running surface of the tread when new. The function of these cutouts is to create ridges for cutting through the film of liquid which may be present on the roadway and to serve as passages for the flow of the same liquid in order to improve the safety of a vehicle fitted with such tires on ground covered in liquid.

However, the presence of deep cutouts allowing the technical effects mentioned above to be benefited from for the entire service life of the tread (corresponding generally to the wear limit acceptable for this tread) results in a significant reduction in the overall rigidity of the tread (crushing rigidity and shearing rigidity in a direction parallel to the contact with the ground). To lessen the effect of this reduction in rigidity, it has been proposed, for example in the patent application published under number WO98/54009, to form on the running surface when new grooves of reduced depth, that is to say not involving the entire thickness of the tread and, by way of supplement, channels situated entirely beneath the running surface. These channels do not open onto the running surface when new and are provided to form new grooves after sufficient partial wear of the tread. The grooves opening onto the running surface when new are designed to disappear after wear approaching or slightly greater than the wear necessary for the formation of new grooves by the channels.

The tread patterns produced according to this teaching result in a significant improvement; however, under certain conditions irregular wear may develop at the edges (or ridges) of the tread pattern elements newly created by the new grooves formed at the moment when the channels reach the running surface. Irregular wear means wear which develops more over certain regions of the tread and which does not develop homogeneously within the thickness of the tread; this wear may necessitate premature withdrawal of the tire provided with such a tread.

EP 1125709 describes a tread band comprising incisions having a geometry circular produced by molding thanks to a device having a part mobile in rotation.

It became clear that there was a need for an improvement in tread patterns for heavy vehicle tires which, while achieving good performance levels on various types of ground, allowed maintenance of considerable rigidity and prevention of the appearance and development of irregular wear.

SUMMARY OF THE INVENTION

To this end, the tread according to the invention, comprising, when new:
 a running surface;
 a plurality of cutouts defining tread pattern elements involving part of the thickness of the tread;
 a plurality of cavities beneath the running surface when new, these cavities being intended to form new grooves or incisions after partial wear of the tread;
 each cavity defined by the rubber mix of the tread having an upper generating line (that is to say a line grouping together all the points of the tread delimiting said cavity and situated closest to the running surface) which is not wholly contained in a surface parallel to the running surface (2) when new;
is characterized in that, for each cavity (20), the upper generatrix (21) follows an undulating profile having a series of recesses and elevations, the amplitude of these recesses and elevations being at least 10% of the depth of the new grooves or incisions created.

Preferably, the amplitude of the recesses and the elevations of one and the same upper generatrix are at most equal to 50% of the depth of the new grooves or incisions created.

The upper generatrix of a cavity comprises those points of each cross-section of said cavity situated closest to the running surface when new; these points are the first to reach the running surface in the course of wear of the tread.

With a tread according to the invention, each cavity opens not in its entirety (that is to say over its entire length) onto the running surface after partial wear but rather progressively. In this manner, new grooves or incisions are created which define new tread pattern elements between which there exist bridges of rubber, at least in a first phase; this has the effect of adapting the rigidity levels of the tread and of reducing or even preventing the appearance of localized wear on these new tread pattern elements (this irregular wear appearing instead from the time when the new elements have just been formed).

On the other hand, the progressive formation of grooves or incisions on the running surface is beneficial since it has been noted that it reduces the risk of splits forming in the rubber.

A maximum separation between those points of the contour of a cavity closest to the running surface when new, that is to say the points appearing first on the running surface after partial wear, and the points of the same generatrix appearing last of at least equal to 10% of the total depth of said cavity is a dominant factor in obtaining good wear performance. The total depth of a cavity corresponds to the maximum distance between the points of the contour of this cavity measured in a direction perpendicular to the running surface (corresponding also to the direction of the thickness of the tread).

The upper generatrix of a cavity is sinusoidal or undulating or zigzag in form, the amplitude between the points of maximum and minimum altitude being at least equal to 10% of the total depth of said cavity.

Preferably, the lower generatrix of a cavity is not contained in a virtual surface parallel to the running surface of the new tire (that is to say a surface identical to the running surface and situated at a distance other than zero from this running surface). Preferably, the lower generatrix has a form which is substantially parallel to the geometry of the upper generatrix of the cavity (that is to say having similar undulations) so as to maintain a substantially constant section over the entire length of the cavity.

Advantageously, those points of the upper generating line of each cavity furthest from the running surface are situated, in the direction of the length of the cavity, in the second third of the length L of said cavity.

One particularly advantageous case consists in a previously described cavity being formed by a part molding a groove surmounted (that is to say towards the running surface) by a part molding an incision, said parts being integral with one another. According to the invention, the part of the cavity corresponding to formation of an incision comprises an upper generatrix whose course is not contained wholly in a surface parallel to the running surface when new. Thus, with wear to the tread, certain points of the cavity reach the surface and form an incision extending into the thickness of the tread via a groove after additional partial wear; according to the invention, at least one bridge of rubber is formed between the walls opposite the incision. Advantageously, the part molding an incision comprises means for producing mechanical locking of the walls opposite said incision (zigzag in form, combination of protuberances and recesses for example) which limit the relative displacement between said walls. The values recommended for the amplitudes of the points of the upper generatrix of a cavity may advantageously also apply to the points of the upper generatrix of the incision extending said cavity (for example, the geometry of the part of the incision closest to the running surface of the tread is substantially parallel to the geometry of the upper generatrix of the cavity which it extends).

It was noted that the rolling resistance of a tire according to the invention was improved relative to a tire provided with cavities not having the characteristics of the cavities according to the invention; this reduction in rolling resistance is probably associated with limitation of the deformation of the tread at the time when new grooves are formed.

BRIEF DESCRIPTION OF THE DRAWINGS

Other characteristics and advantages of the invention are revealed by the description made hereafter with reference to the appended drawings, which show embodiments of the subject matter of the invention by way of non-limiting example:

FIG. 4 shows a molding element intended for molding a cavity extended towards the outer surface of a tread by an incision;

FIG. 5 shows a section along line V-V of the molding element illustrated in FIG. 4;

FIG. 6 shows a section along line VI-VI of the molding element illustrated in FIG. 4.

DESCRIPTION OF THE PREFERRED EMBODIMENTS

Figure 1:
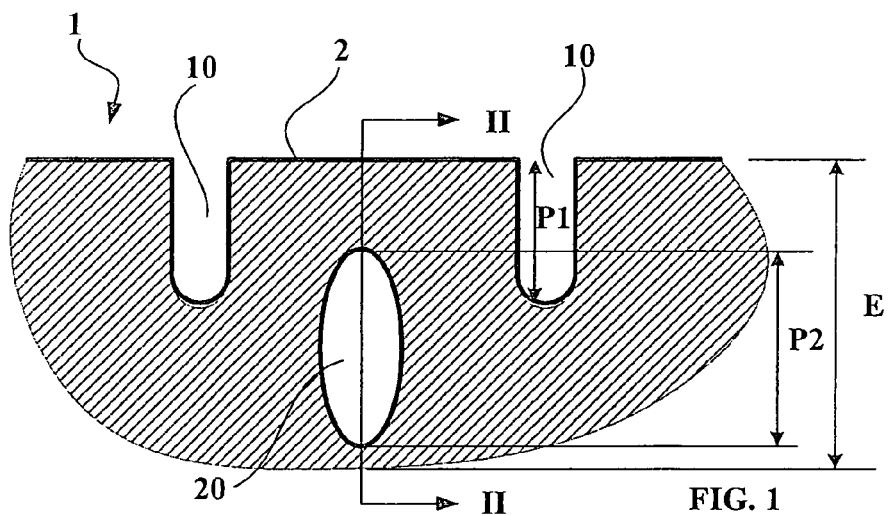
FIG. 1 shows a section through a tread according to the invention.

FIG. 1 shows a partial section through a tread 1 according to the invention comprising a plurality of first grooves 10 defining relief elements forming a tread pattern when new (that is to say not worn). This tread has a running surface when new 2 intended to come into contact with the roadway during travel of a tire provided with this tread.

These grooves 10 have a depth P1 less than the total thickness E of the tread (in the present case, this depth P1 is substantially equal to 50% of the thickness E).

Furthermore, a cross-section is shown through a cavity 20 entirely situated beneath the running surface 2 when new; in the section plane, this cavity has a substantially elliptical section whose large axis i.e., radial dimension (substantially perpendicular to the running surface 2) is of the length P2 substantially equal to the depth P1. This cavity is intended to form a new groove once partial wear of the tread has brought the upper part of said cavity up to the new running surface. In the present case, the new groove is formed even before the complete disappearance of the first grooves.

So as to prevent the formation of irregular wear on the edges of the rubber elements defining the new groove formed on the running surface after partial wear, the upper generating line 21 of the cavity 20 has, viewed in section along line II-II (that is to say in a plane perpendicular to the plane of FIG. 1 and passing through the foci of the ellipse forming the contour of the section of the cavity), a geometry which is composed of three substantially straight parts 22, 23, 24 parallel to the running surface 2, the end parts 22 and 24 being connected to the intermediate part 23 by inclined parts 25, 26. Furthermore, the intermediate part 23 is situated at a distance D1 from the running surface 2 which is greater than the distance D2 separating the end parts 22 and 24 from the same surface 2. In the case illustrated, the difference between the distances D2 and D1 is greater than 20% of the maximum dimension P2 of the cavity.

Figure 3:
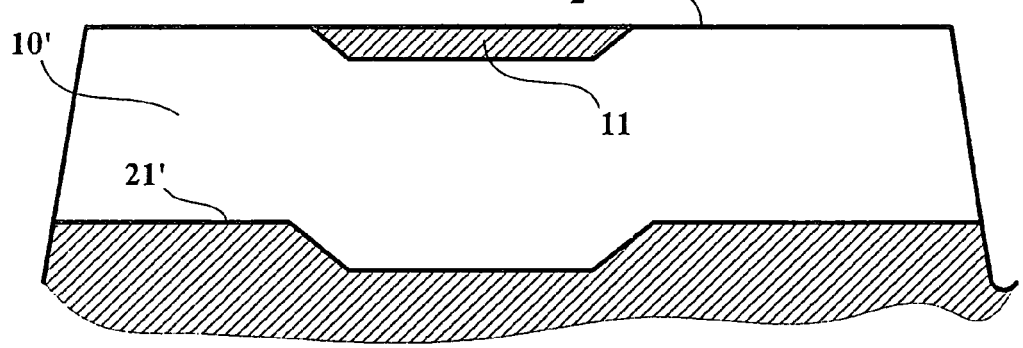
FIG. 3 shows the same section as that of FIG. 2 after partial wear of the tread according to the invention.

When wear to the tread is sufficiently advanced, the end parts 22 and 24 of the upper generatrix 21 of the cavity 20 appear at the new running surface and a new groove is formed whose opposing walls are connected between a depth D2 and a depth D1 by a bridge of rubber mix 11 (visible in FIG. 3). The presence of at least one bridge 11 ensures a level of rigidity which is sufficient to prevent the appearance of irregular wear on the edges of the running surface elements formed, while the groove volume is renewed by formation of a new groove.

The parts 22, 23, 24 forming the upper generatrix 21 have lengths respectively of L1, L2, L3, the length L2 being greater than each of the other two lengths L1 and L3.

Figure 2:
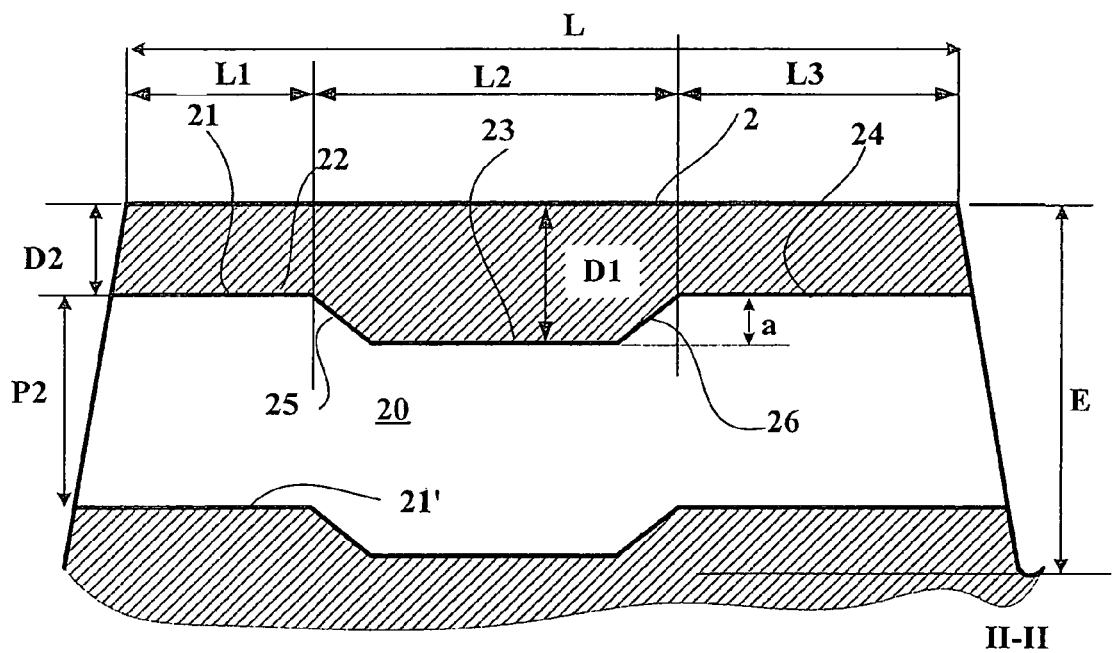
FIG. 2 shows a section along line II-II of the tread shown in FIG. 1.

In the example shown in FIGS. 1, 2 and 3, the cavity 20 has a lower generatrix 21' which is substantially parallel to the upper generatrix 21 of the same cavity so as to ensure a substantially constant cavity section whatever the section plane.

After sufficient partial wear (that is to say wear at least equal to D2), the tread adopts the configuration shown in FIG. 3 according to which a new groove 10' opens onto the new running surface 2', this groove 10' comprising in its upper part, that is to say in the vicinity of the running surface 2', a bridge of rubber mix 11 connecting the opposing walls defining said new groove 10'. The presence of this rubber bridge makes it possible to connect mechanically the opposing tread pattern elements for wear corresponding to the height a of the bridge 11.

In another variant shown with the aid of FIGS. 4, 5, 6, a tread has at least one cavity beneath the running surface when new, for forming in a first phase an incision opening only partially onto the running surface and in a second phase a groove (the incision widening progressively to form this groove).

FIG. 4 shows more precisely a component 3 of a mold intended to mold the cavity just mentioned. This component 3 comprises an upper part 31 suitable for molding an incision of a width of less than 2.5 mm and a lower part 32 of a width greater than 2.5 mm (here at least 4 times the width of the incision), said two parts being integral with one another. The upper generatrix 310 of the upper part 31 has a geometric course which is non-uniform such that the heights of the sections of said mold component 3 are not constant and vary as one moves along the length L of the component.

In the case illustrated, the upper generatrix 310 of the upper part 31 follows an undulating geometric course; in FIGS. 5 and 6 showing cross-sections of the component (3), it is possible to see that the section heights are respectively H1 and H2 (the height H1 being greater than the height H2). At the time of use, this component molds a cavity whose upper part (that is to say closest to the running surface) is an incision, this incision having an upper generatrix which is not contained fully in a surface parallel to said running surface when new.

In this manner, when, after partial wear of a tread comprising a cavity molded with the component 3 described, certain of the points of the upper generatrix of the incision reach the running surface (corresponding to points 312 on the component), the total volume of the cavity (groove and incision) is available for the evacuation of fluids (water, air) despite the existence of zones linking the opposing walls of the incision (corresponding to the recessed zones 311) which will limit the risk of the appearance of irregular wear.

In the example described, the maximum amplitude, between those points 312 of the upper generatrix 310 closest to the running surface and the points 311 of the same generatrix furthest therefrom, is at least equal to 20% of the total maximum height H of the component 3.

In practice, the component 3 is mounted on a mold intended for molding a rubber tread as described for example in the patent application published under number WO98/54009, demolding of a molded tread being effected by withdrawing the component 3 in a first phase before extracting said tread from the mold.

The invention is not limited to the examples described and illustrated and various modifications may be made thereto without going beyond the scope thereof. In particular, the profile connecting the upper part 31 and the lower part 32 may follow a geometry substantially identical to that of the upper generatrix of the upper part 31.

The invention claimed is:

1. A rubber tread of a total thickness E for tires, comprising when new:
   a running surface intended to be in contact with a roadway during travel;
   a plurality of cutouts of a depth less than the thickness E and defining tread pattern elements of a height less than the thickness E, the cutouts opening onto the running surface in the new tread; and
   a plurality of cavities devoid of tread rubber and spaced radially inwardly from the running surface of the new tread and extending over an average length L, each of these cavities comprising an incision and a groove, the groove disposed radially inwardly with respect to the incision and communicating with a radially inner end of the incision in the new tread, the groove having a maximum width greater than a maximum width of the incision, each cavity having an end opening onto a lateral side of the tread pattern element;
   each incision having a radially outer generatrix which follows an undulating profile having an amplitude (a) which is at least 20% of the maximum height of the cavity, wherein following a partial wear of the tread the incision opens onto the running surface and connects the running surface with the groove;
   wherein the groove has a radially outer generatrix that follows a geometry that is substantially identical to the radially outer generatrix of the incision;
   wherein the width of the incision is not greater than 2.5 mm, and the width of the groove is greater than 2.5 mm.

2. The tread according to claim 1 wherein a radially innermost point of the undulating profile is spaced radially outwardly from the respective groove.

3. The tread according to claim 2 wherein said end of said cavity constitutes one of two ends of said cavity, both of said ends opening onto respective lateral sides of the tread pattern element.

4. The tread according to claim 1 wherein said end of said cavity constitutes one of two ends of said cavity, both of said ends opening onto respective lateral sides of the tread pattern element.

5. The tread according to claim 1 wherein the incision extending the cavity is defined by walls of rubber mix, said walls constituting mechanical locking means opposing relative movement between said walls.

6. The tread according to claim 1 wherein each groove includes a radially inner generatrix which is not contained in a virtual surface parallel to the radially outer generatrix.

* * * * *